United States Patent [19]

Granda et al.

[11] 4,017,427
[45] Apr. 12, 1977

[54] FAST COOLING STYRENE POLYMER FOAMS

[75] Inventors: Jose E. Granda, Aliquippa, Pa.; John J. Quinlan, Atco, N.J.; James J. Garland, Aliquippa, Pa.

[73] Assignee: ARCO Polymers, Inc., Philadelphia, Pa.

[22] Filed: May 30, 1975

[21] Appl. No.: 582,332

[52] U.S. Cl. .......................... 260/2.5 B; 260/2.5 H; 260/2.5 HB; 260/827
[51] Int. Cl.² .............. C08F 112/08; C08F 212/08; C08J 9/04; C08J 9/06
[58] Field of Search ............... 260/2.5 HA, 2.5 HB, 260/2.5 B, 827, 2.5 H

[56] References Cited

UNITED STATES PATENTS

| | | | |
|---|---|---|---|
| 3,280,160 | 10/1966 | Bailey | 260/2.5 AH X |
| 3,471,588 | 10/1969 | Kanner et al. | 260/2.5 AH X |
| 3,505,253 | 4/1970 | Finestone et al. | 260/827 |
| 3,541,127 | 11/1970 | Beattie et al. | 260/827 |
| 3,635,852 | 1/1972 | Finestone et al. | 260/2.5 B |
| 3,657,164 | 4/1972 | Jastrow et al. | 260/2.5 B |
| 3,793,242 | 2/1974 | Ilavsky | 260/2.5 B |
| 3,835,073 | 9/1974 | Thimas | 260/827 |
| 3,856,719 | 12/1974 | Miyamoto et al. | 260/2.5 HA |

OTHER PUBLICATIONS

Frisch et al., *Plastic Foams I*, Part II, pp. 532–536, 538–540, 542, 543, (Dekker 1973).
Benning, *Plastic Foams II*, pp. 320–325 (Wiley-Inter-Science 1969).

*Primary Examiner*—Allan Lieberman
*Attorney, Agent, or Firm*—Lewis J. Young

[57] ABSTRACT

Expandable styrene polymer particles which have fast cooling rates during molding are produced by suspending styrene polymer particles in an aqueous medium and impregnating a blowing agent into the particles in the presence of 0.05 to 0.4 parts of silicone surfactant per 100 parts of polymer particles. The silicone surfactant is selected from the siloxane-oxyalkylene copolymers having at least one polysiloxane block which contains mers of the general formula $R_2SiO$, where R is selected from the group consisting of alkyl having 1 to 4 carbon atoms and halogenated alkyl having 1 to 4 carbon atoms, and at least one polyoxyalkylene block containing mers of general formula $C_nH_{2n}O$, where n is 2, 3 or 4, attached to said polysiloxane block and terminated by hydroxyl groups.

12 Claims, No Drawings

FAST COOLING STYRENE POLYMER FOAMS

BACKGROUND OF THE INVENTION

This invention relates to a process for making foamed styrene polymers fast cooling during molding by incorporating silicone surfactants into the polymer during the impregnation of the polymers with a blowing agent.

The making of low density, cellular, shaped, plastic articles from expandable particles of styrene polymers is well known. Such particles generally contain a blowing agent which boils below the softening point of the polymer and which will cause the particles to expand when they are heated. When the expanded particles are heated in a mold cavity, the particles expand further to fill the mold and fuse together to form a shaped article.

This invention also relates to a process for producing thick-section moldings of foamed styrene polymers.

The formation of molded articles from expandable styrene polymer particles is effected in two steps:

1. pre-expanding of foamable styrene polymer particles to a density of between 1 and 2 pounds per cubic foot; and
2. further heating the pre-expanded particles in a closed mold to cause further expansion and form a fused, one piece article having the shape of the mold. The second step is what is normally referred to as "molding".

The pre-expansion step may be carried out by heating the expandable polymer pellets by any suitable heating medium such as steam, hot air, hot water, or radiant heat. An excellent method of pre-expansion of the particles is a process such as that disclosed in U.S. Pat. No. 3,023,175 by Rodman. Another excellent method is that disclosed in U.S. Pat. No. 3,577,360 by Immel, which teaches the pre-expansion of polymer beads by heating in a dry atmosphere followed by the application of a vacuum to cause the particles to expand to the desired density.

The molding step normally comprises 4 cycles: (1) the preheating cycle in which the empty mold is preheated with steam; (2) the fill cycle in which the mold is filled with pre-expanded polymer particles; (3) the fusion cycle in which the mold is closed and heated with steam to further expand the particles therein and cause the particles to fuse together; and (4) the cool cycle in which the mold is cooled, usually with recirculating water, or the application of vacuum, to cool the polymer below the softening point of the polymer, the mold is opened and the molded foamed molding is removed from the mold.

The molding of large cross-section (thick-section) billets of foamed styrene polymers, that are greater than one foot in the smallest dimension, presents many problems not encountered in the molding of thin section parts.

One of these problems is the fact that as the particles expand in the fusion cycle against the hot mold surfaces, the surface of the billet fuses into a solid surface which insulates the core or center portion of the billet from the heating medium. The resulting molded billet thus has a well-fused surface but has decreasingly good fusion as the core of the billet is approached. This decreased internal fusion of the billet is highly undesirable because the core particles tend to break away from one another or crumble, when the billet is cut up into smaller sizes.

A further problem in the molding of large billets is that during the preheat cycle large amounts of steam are required to heat the massive molds. The preheat cycle is done with the vent drains of the mold open to permit the drainage of condensed water from the mold. The peheat cycle is normally necessary because if the mold is cold when the fusion cycle is begun, the steam used for expanding the particles condenses on the surface of the cold mold causing excess water to be present during the fusion cycle. The water thus formed tends to prevent fusion between the particles and to produce water-wet moldings.

The problems of the fusion and preheat cycles can be eliminated by the process of pre-steaming, as described in U.S. Pat. No. 3,855,377.

After the granules have been heated in the mold to form the desired article, the article must be cooled for a relatively long period of time, depending upon the thickness of the article, before it can be removed from the mold in a self-supporting state to retain its shape outside the mold. Foamed plastic has good insulation qualities, so the cooling time for the article consumes a large part of the molding cylce and greatly restricts the number of articles that can be produced from a mold in a given period of time.

The cooling time is not appreciably shortened by applying cooling media to the surface of the article or to the mold surface since the heat transfer through the article is extremely slow. This low heat transfer rate is in fact one of the properties wich makes these articles useful, for example, for insulation. If the articles are removed from the mold too soon, the combination of the softness of the thermoplastic material and the pressure due to the hot interior of the article will cause the article to bulge and thereafter not have the desired shape.

SUMMARY OF THE INENTION

In accordance with the present invention, surfactants, selected from the siloxane-oxyalkylene copolymers having at least one polysiloxane block which contains mers of the general formula $R_2SiO$, where R is selected from the group consisting of alkyl having 1 to 4 carbon atoms and halogenated alkyl having 1 to 4 carbon atoms, and at least one polyoxyalkylene block containing mers of the general formula $C_nH_{2n}O$, where $n$ is 2, 3, or 4, attached to said polysiloxane block and terminated by hydroxyl groups, are incorporated into styrene polymer particles during the process of impregnating the particles with a blowing agent. Incorporation of from 0.05 to 0.4 parts of silicone surfactant per 100 parts of polymer gives a foamable product which, when molded, requires less time to cool than styrene polymers not having the surfactant present.

DETAILED DESCRIPTION OF THE INVENTION

In accordance with this invention, a variety of expandable thermoplastic homopolymers and copolymers can be rendered fast cooling. The polymers may be derived from vinyl aromatic monomers including styrene, vinyltoluene, isopropylstyrene, alpha-methylstyrene, nuclear methylstyrene, chlorostyrene, tert-butylstyrene, etc., as well as copolymers prepared by the copolymerization of a vinyl aromatic monomer with monomers such as butadiene, alkyl methacrylates, alkyl acrylates, acrylonitrile and maleic anhydride wherein the vinyl aromatic monomer is present in at least 50% by weight of the copolymer. For the purpose of convenience, these polymers and copolymers are referred to herein as styrene polymers.

Especially useful are polystyrene, and copolymers of styrene with 5–30 weight percent of acrylonitrile, maleic anhydride, or methyl acid maleate.

The styrene polymers may be in the form of beads, granules, or other particles convenient for molding operation. Especially useful are the beads formed by the suspension polymerization of the vinyl aryl monomers alone or in combination with the minor amount of copolymerizable monomers.

The styrene polymers, can, of course, be produced by any of the known techniques. The preferred method of preparation is the suspension technique, which gives bead or pellet shaped product.

The silicone surfactant may be added to the polymer particles after the particles have been completely polymerized (i.e., as a hard bead impregnation). Addition of silicone surfactant prior to substantially complete polymerization can result in upsetting the delicate balance needed for the polymerization reaction and would result in interference with the reaction. The addition, in this instance, is to the aqueous suspension in which the particles were prepared and prior to separation of the particles from the aqueous reaction medium. The blowing agent can be added either prior to hard bead formation or simultaneously with the silicone surfactant.

Alternatively, particles of styrene polymer may be resuspended in an aqueous medium and impregnated with blowing agent and silicone surfactant. In this case, suspending agents are added to the water to keep the particles from agglomerating at the elevated temperatures used during the impregnation process. Suitable suspending agent systems are, for example, those described in D'Alelio U.S. Pat. No. 2,983,692, such as tricalcium phosphate in combination with an anionic surfactant.

The impregnation is conventionally carried out at temperatures ranging from about 80° to 150° C. Increasing the temperature makes the impregnation proceed at a faster rate.

The blowing agents are compounds which are gases or which will produce gases on heating. Preferred blowing agents include aliphatic hydrocarbons containing from 4–7 carbon atoms in the molecule, such as butane, pentane, hexane, heptane, cyclohexane, and the halogenated hydrocarbons which boil at a temperature below the softening point of the polymer. Mixtures of these agents may also be used, such as a mixture of 40–60% n-pentane and 60–40% trichlorofluoromethane. Usually from 3 to 20% of blowing agent per 100 parts of polymer is incorporated by the impregnation.

The silicone surfactant suitable for the present invention are the siloxane-oxyalkylene copolymers having at least one polysiloxane block which contains mers of the general formula $R_2SiO$, where R is selected from the group consisting of alkyl having 1 to 4 carbon atoms and the halogenated alkyl having 1 to 4 carbon atoms, and at least one polyoxyalkylene block containing mers of general formula $C_nH_{2n}O$, where $n$ is 2, 3 or 4, attached to the said polysiloxane block and terminated by hydroxyl groups.

The oxyalkylene mer $C_nH_{2n}O$ may be, for example, oxyethylene, oxy-1,2-propylene, oxy-1,3-propylene, oxy-1,2-butylene or oxy-1,4-butylene. The block $(C_nH_{2n}O)_m$, when polymeric may be a homopolymer or a copolymer containing different oxyalkylene mers.

Preferred siloxane-oxyalkylene copolymers suitable for this invention are the dimethylsiloxaneoxyalkylene copolmers having a number average molecular weight of between 1,400 and 3,000 of which the polyoxyalkylene blocks make up between 90 and 1,000, the polyoxyalkylene blocks are terminated on one end by the polysiloxane block and on the opposite end by a hydroxy group, and the polyoxyalkylene blocks contain at least 75% by weight of ethylene oxide, the remainder being preferably propylene oxide.

The siloxane-oxyalkylene copolymers may be prepared by any of the known processes such as, for example, those described in U.S. Pat. Nos. 2,834,748; 2,917,490, 3,518,288; 3,541,127; 3,560,544; or 3,563,924.

The silicone surfactant may be added to the suspension of polymer particles at the same time as the blowing agent. Best results are obtained when amounts of silicone surfactant between 0.05 and 0.4 parts per 100 parts of polymer are added. Less than 0.05 part of surfactant does not give sufficiently low cooling times, greater than 0.4 parts of surfactant serve no useful purpose and increase the cost of the products.

The invention is further illustrated by the following examples wherein parts are parts by weight unless otherwise indicated.

EXAMPLE I

To a reactor, there was charged in sequence 100 parts of water, 0.025 part of sodium dodecylbenzenesulfonate, 2.0 parts of tricalcium phosphate, 100 parts of polystyrene beads having a particle size of predominantly through 16 and on 35 mesh, U.S. Standard Sieve, 8.5 parts of n-pentane, and 0.25 parts of silicone surfactant [dimethylsiloxane-oxyethylene copolymer having a number average molecular weight of about 2400 with polyoxyethylene chains having a total number average molecular weight of about 900, a hydroxyl number of 70, and a viscosity of about 350 centistokes at 77° F]. The mixture was stirred and heated during 1 hour to 90° C. to form a suspension. The suspension was maintained at 90° C. for 3 hours and then the temperature was raised during 0.5 hour to 115° C. and maintained at that temperature for an additional 6 hours. The suspension was cooled to room temperature and acidified to a pH of 1.4 with HCl. The beads were separated from the aqueous phase by centrifuge, washed with water, and air dried to room temperature. A control experiment was run using the above procedure omitting the siloxane-oxyethylene copolymer.

The beads from the above impregnation process were pre-expanded to a density of about 1.00 pounds per cubic foot (p.c.f.). The pre-expanded beads were then molded into 98 inches × 25 inches × 18 inches billets by placing the beads in a conventional mold consisting of a porous mold cavity surrounded by a steam chest. Steam at 30 psig was introduced into the steam chest to cause the granules to expand and fuse together. After the steam was shut off, cooling water was circulated through the steam chest. (As used, hereinafter, the term "foam cooling time" is defined as the time it is necessary to circulate the cooling water at 30° C. through the steam chest before the billet is self supporting and will not expand when it is removed from the mold cavity.) Billets molded from these granules were self supporting and could be removed from the mold after 9 minutes foam cooling time. Billets molded from the control granules had a foam cooling time of 40 minutes.

Repeating this procedure using concentrations of 0.15 and 0.40 part of the same dimethylsiloxane-oxyethylene copolymer gave products having foam cooling times of 15 and 18 minutes, respectively. This represented savings in overall molding cycle time of 58 and 51%, respectively.

EXAMPLE II

The impregnation of Example I was repeated except that the silicone surfactant was replaced with 0.25 parts of a dimethysiloxane-oxyalkylene copolymer having a number average molecular weight of about 1600, a hydroxyl number of 65, and a viscosity of 250 centistokes at 77° F, with a polyoxyalkylene chain having 75% oxyethylene mers and 25% oxypropylene mers and a total number average molecular weight of about 500.

The expandable polystyrene beads from this process were then pre-expanded and molded by the procedure of Example I. The molded billets had a foam cooling time of 11 minutes. This represents a savings of 66% of the total molding cycle time.

Repeating this procedure using concentrations of 0.15, and 0.40 parts of the dimethylsiloxane-oxyalkylene copolymer gave products having foam cooling time of 13 minutes for both concentrations — a 62% savings in overall molding cycle time.

EXAMPLE III

To illustrate the necessity of introducing the siloxane-oxyalkylene copolymers by the impregnation method of the invention, the silicone surfactants used in Example I and Example II were added to the polystyrene beads as follows:

Expandable polystyrene beads having 8.0% pentane as blowing agent were dry blended with 0.25 parts of silicone surfactant per 100 parts of polymer. Blending was carried out for 30 seconds in a Henschel mixer to completely coat the polymer beads with the surfactants.

On pre-expansion and molding in the thick cross-section billet molds, the coated beads gave products having increased foam cooling times rather than decreased times. Thus, beads coated with the dimethylsiloxane-oxyethylene copolymer of Example I had a foam cooling time of 40 minutes compared to a time of 35 minutes for the uncoated polystyrene beads — an increase of 5 minutes in cool time and, correspondingly, 5 minutes increase in total mold cycle times. Similarly, beads coated with the dimethylsiloxane-oxyalkylene copolymer used in Example II gave coated beads having a foam cooling time of 45 minutes — again an increase in total mold cycle time.

This shows that merely coating the styrene polymer particles with the silicone surfactants is not sufficient to form a fast cooling type expandable beads. The surfactant must be dispersed into the polymer by impregnation.

The production of articles having a foamed polymer structure involves generally a molding cycle that includes preheating the mold, charging the mold with expandable polymeric particles, heating the granules in the mold, and then cooling the resulting foamed structure to a temperature at which the material is self-supporting and will retain its shape. The time consumed in a typical molding process as carried out heretofore breaks down as follows:

mold preheat — about 0.25 minutes
filling the mold — about 1 to 3 minutes
heating the mold to fuse — about 0.5 minutes
cooling the finished article — about 35 to 45 minutes From these times, it is obvious that the major portion of the time involves the cooling step.

In the present invention, the foam cooling time is reduced to as little as 9 minutes. Since the other three times remain the same, the overall mold cycle time is reduced by as much as 70%. This means that by using the product of the invention, over twice as many articles can be produced from the same piece of molding equipment in a given period of time as compared with the production of articles by the use of the heretofore known expandable polymers.

What is claimed is:
1. Method of making foamable styrene polymer particles which yield a fast cooling foamed molding comprising the steps of:
   a. suspending styrene polymer particles in water with the aid of a suspending agent system;
   b. adding 3 to 20 weight percent of a blowing agent and 0.05 to 0.4 weight percent of a silicone surfactant selected from the siloxane-oxyalkylene copolymers having (1) at least one polysiloxane block which contains mers of the general formula $R_2SiO$ where R is selected from the group consisting of alkyl having 1 to 4 carbon atoms and halogenated alkyl having 1 to 4 carbon atoms, and (2) at least one polyoxyalkylene block attached to said polysiloxane block, and terminated by hydroxyl groups, and containing mers of general formula $C_nH_{2n}O$, where $n$ is 2, 3 or 4;
   c. heating the suspension at a temperature of from 80° to 150° C. to impregnate the polymer particles; and
   d. separating the impregnated particles from the aqueous system.

2. The method of claim 1 wherein said styrene polymer particles are polystyrene.

3. The method of claim 1 wherein said styrene polymer particles are a copolymer of styrene with minor amounts of maleic anhydride.

4. The method of claim 1 wherein said styrene polymer particles are a copolymer of styrene with minor amounts of acrylonitrile.

5. The method of claim 1 wherein said styrene polymer particles are a copolymer of styrene with minor amounts of methyl acid maleate.

6. The method of claim 1 wherein said silicone surfactant is a dimethylsiloxane-oxyalkylene copolymer having a number average molecular weight of between 1400 and 3000, of which the polyoxyalkylene blocks make up between 90 and 1000, and the polyoxyalkylene blocks contain at least 75% by weight of ethylene oxide.

7. A composition consisting essentially of particles of a styrene polymer containing dispersed throughout 3 to 20 weight percent of a blowing agent and 0.05 to 0.4 weight percent of a silicone surfactant, said surfactant being dispersed by impregnation into the polymer with the blowing agent, and said surfactant being a siloxane-oxyalkylene copolymer having (1) at least one polysiloxane block which contains mers of the general formula $R_2SiO$ where R is selected from the group consisting of alkyl having 1 to 4 carbon atoms and halogenated alkyl having 1 to 4 carbon atoms, and (2) at least one polyoxyalkylene block attached to said polysiloxane block, and terminated by hydroxyl groups and containing mers of general formula $C_nH_{2n}O$, where $n$ is 2,3, or 4; said particles being fast cooling during molding in thick-section billets that are greater than one foot in the smallest dimension.

8. The composition of claim 7 wherein the silicone surfactant is s dimethylsiloxane-oxyalkylene copolymer having a number average molecular weight between 1400 and 3000, of which the polyoxyalkylene blocks make up between 90 and 1000, and the polyoxyalkylene blocks contain at least 75 weight percent of ethylene oxide.

9. The composition of claim 7 wherein the styrene polymer is polystyrene.

10. The composition of claim 7 wherein the styrene polymer is a copolymer of styrene with minor amounts of acrylonitrile.

11. The composition of claim 7 wherein the styrene polymer is a copolymer of styrene with minor amounts of maleic anhydride.

12. The composition of claim 7 wherein the styrene polymer is a copolymer of styrene with minor amounts of methyl acid maleate.

* * * * *